United States Patent
Piech

[15] 3,707,092
[45] Dec. 26, 1972

[54] DRIVE CHAIN FOR DRIVING SHAFTS ON WHEELS, ESPECIALLY FOR CAMSHAFT DRIVES OF INTERNAL COMBUSTION ENGINES

[72] Inventor: Ferdinand Piech, Stuttgart-Nord, Germany

[73] Assignee: Firma Dr. Ing., h.c. F. Porsche KG, Stuttgart-Zuffenhausen, Germany

[22] Filed: Feb. 9, 1971

[21] Appl. No.: 113,852

[30]     Foreign Application Priority Data
Feb. 19, 1970    Germany.....................P 20 07 619.1

[52] U.S. Cl.............................74/245 R, 123/90.19
[51] Int. Cl. ...........................F16g 13/02, F01l 1/00
[58] Field of Search.............74/245 R, 253 R, 250 R; 123/90.19

[56]          References Cited
UNITED STATES PATENTS 3,029,654   4/1962   Hill....................................74/216.5
2,330,719   9/1943   Kishline............................123/90.19

*Primary Examiner*—Leonard H. Gerin
*Attorney*—Craig and Antonelli

[57]              ABSTRACT

Drive chain for driving shafts and wheels which are arranged with axes parallel to each other in a housing consisting of light alloy material such as magnesium alloy. The drive chain is especially useful for driving camshafts of internal combustion engines and consists of individual, movably assembled members such as side straps and rollers supported on bolts which are connected with each other by the side straps. The side straps consist of a material which has a temperature-expansion coefficient at least nearly equal to that of the housing material.

11 Claims, 2 Drawing Figures

PATENTED DEC 26 1972

3,707,092

Inventor:
FERDINAND PIËCH

BY Craig, Antonelli, Stewart & Hill
ATTORNEYS

DRIVE CHAIN FOR DRIVING SHAFTS ON WHEELS, ESPECIALLY FOR CAMSHAFT DRIVES OF INTERNAL COMBUSTION ENGINES

BACKGROUND OF THE INVENTION

The present invention relates to a drive chain for driving shafts and wheels which are arranged with parallel axes and at a distance from each other in a housing consisting of a light alloy, and more particularly, to a drive chain for driving camshafts of internal combustion engines in which the drive chain consists of individual, movably assembled members such as side straps and rollers supported on bolts which are connected to each other by the side straps.

It is known to drive the camshaft of an internal combustion engine by means of a drive chain from the crankshaft. These chain drives have the disadvantage, however, that the chain housing expands more than the drive chain when the operating temperature of the internal combustion engine is reached. This expansion becomes larger with a greater difference between the coefficient of expansion of the material for the chain housing and the chain drive.

In order to compensate for these expansions, the chain drive has, in the past, been guided over damping elements and relatively expensive tensioning devices in an attempt to avoid subjecting the drive to larger oscillations and thereby resulting in early and extensive wear of the drive chain and chain sprockets on the shaft bearings. Further, a camshaft drive means for high-output engines also has a disadvantage in that, as a result of differences in expansion of the drive chain and chain housing, the control timing of the internal combustion engine is changed, thereby decreasing the output of the internal combustion engine.

SUMMARY OF THE INVENTION

It is the aim of the present invention to overcome the problems and disadvantages encountered in the prior art arrangements.

It is also an object of the present invention to provide a novel arrangement of a chain drive for a camshaft drive of an internal combustion engine.

More specifically, it is an object of the present invention to provide a drive chain for wheels and shafts, especially for driving camshafts of internal combustion engines, which drive change does not require expensive tensioning and damping devices.

The foregoing problems and disadvantages have been solved in accordance with the present invention by the provision of side straps of the drive chain for connecting the individual rollers or bolts, which side straps consist of a material having a temperature-expansion coefficient which is at least close to that for the housing accommodating the shafts or wheels. For chain drives in which the housing accommodating the drive chain and shafts or the wheels consists of a magnesium alloy, it is advantageous to provide a material for the side straps of the chain drive consisting of a high heat-stable or resistant steel alloy containing a preponderate amount of nickel and manganese.

The advantages achieved in accordance with the present invention reside essentially in that, through the above-described construction of the drive chain, the temperature expansion between the housing and the chain drive are nearly equal, thereby allowing expensive tensioning devices for the drive chain to be eliminated. In addition, the predetermined control timing for the camshaft drive can be maintained constant throughout the entire speed range of the internal combustion engine. Further, the selected material combination results in a higher degree of rigidity of the entire drive, thereby resulting in a longer life and a relatively quiet drive at all operating conditions of the internal combustion engine.

BRIEF DESCRIPTION OF THE DRAWING

These and further aims, features and advantages of the present invention will become more apparent from the following description when taken in conjunction with the accompanying drawing which shows, for purposes of illustration only, an embodiment in accordance with the present invention and wherein.

DETAILED DESCRIPTION OF THE DRAWING

Figure 1:
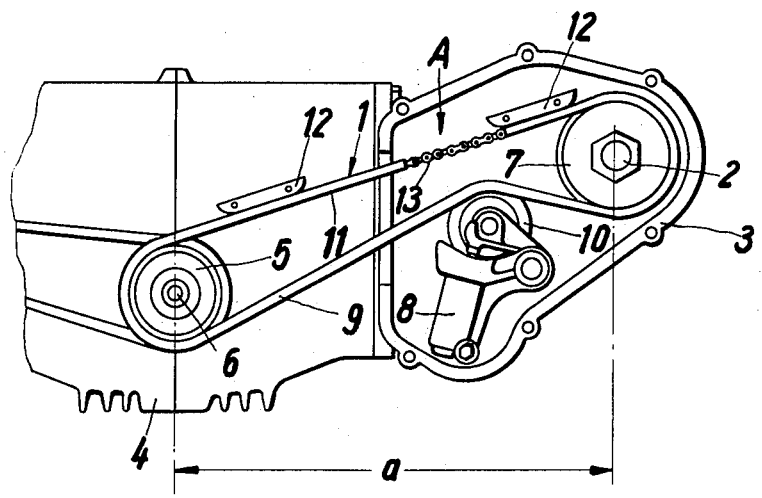
FIG. 1 is a front view of a camshaft drive for an internal combustion engine by means of a drive chain in accordance with the present invention.

Referring now to the drawing and, in particular, to FIG. 1, a drive chain 1 serves for driving a camshaft 2 arranged in a chain housing 3 of the internal combustion engine 4, which chain housing is made of a magnesium alloy. The drive for the camshaft 2 is from a chain sprocket 5 of the camshaft 6 through the drive chain 1 to a further chain sprocket 7 of the camshaft 2. Between the crankshaft 6 and the camshaft 2, a conventional chain tensioning device 8 is arranged at the driven part of the chain 9. A chain sprocket 10 transmits the tensioning force of the tensioning device 8 onto the drive chain 1 to retain the predetermined tension of the chain.

Damping members 12 are arranged at the opposite portions 11 of the chain of drive chain 1 and prevent undesired or inadmissible oscillations of the chain portion 11.

Figure 2:
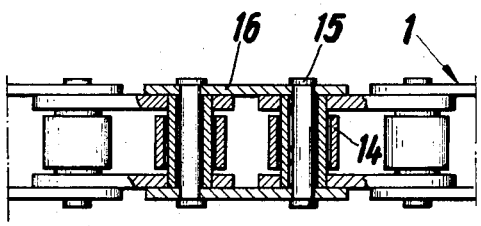
FIG. 2 is a partial cross-sectional plan view of the drive chain in the direction of arrow A of FIG. 1.

With reference to FIG. 2, the drive chain 1 consists of individual, movably assembled chain members 13 consisting of rollers 14 supported on bearing bolts 15. The bearing bolts are held on both sides thereof by connecting straps 16 consisting of a material having a high manganese and nickel content and thus an especially good temperature-expansion coefficient. Such a content is similar to the material known as "Dilavar Ni 13."

During operation of the internal combustion engine 4, the chain housing 3 expands due to hearing and the distance $a$ between the axes of the camshaft 2 and crankshaft 6 is increased. The drive chain 1 is thereby tensioned by the mount of expansion of the chain housing 3 so as to change the timing of the camshaft 2. In order to prevent breaking of the drive chain 1 as well as the avoidance of high bearing loads on the crankshaft 6 or the camshaft 2, it becomes the task of the chain tensioning device 8 to equalize the expansion of the chain housing 3. By this means, however, the chain pretension of the drive chain 1 is increased, thereby resulting in a higher loading of the drive chain 1. Through the selection of the material for the connecting side straps 16, a nearly equal expansion of the drive chain 1 can be attained. The chain housing 3 which consists of a magnesium alloy has a temperature-expansion coefficient of approximately $26 \times 10^{-6}$ m/m · °C and the material for the connecting side straps 16 has a temperature-expansion coefficient of about $21 \times 10^{-6}$ m/m · °C. Due to this, the drive chain 1 will expand by nearly the same amount as the chain housing 3, so that the predetermined chain tension and the control timing of the internal combustion engine are maintained relatively constant. In the arrangement of the present invention, the chain tensioning device 8 serves only as an oscillation damper and for the retention of the original chain tension.

For chain drives in which the distance $a$ is relatively small so that the long, free-hanging chain portions 9, 11 are not present, a chain tensioning device 8 and the damper members 12 are not required without having to worry that the chain drive 1 will be excessively tensioned or will run without pretension so as to be subject to accessive wear. The use of a material with a high nickel and manganese content for the connecting side straps 16 of the drive chain 1 results in an expansion of the drive chain 1 which is compatible with that of the chain housing 3, thereby maintaining the predetermined adjustment during all operating conditions of the drive chain.

While I have shown and described an embodiment in accordance with the present invention, it is to be clearly understood that the same is susceptible of numerous changes and modifications as will be apparent to one skilled in the art. For example, the selection of the material for the connecting side straps may also be utilized for other chain constructions which are also subject to the corresponding requirements set forth above. I, therefore, do not wish to be limited to the details shown and described herein, but intend to cover all such changes and modifications as are encompassed by the scope of the present invention.

I claim:

1. Drive chain for driving shafts and wheels arranged with axes parallel to each other in a housing consisting essentially of a light alloy, especially for driving a camshaft of internal combustion engines, wherein the drive chain comprises individual, movably assembled members including side straps, bolts operatively connected with each other by the side straps and rollers operatively mounted at the bolts, characterized in that the side straps consist of a material having a temperature-expansion coefficient at least nearly equal to the temperature-expansion coefficient of the material of the housing.

2. Drive chain according to claim 1, wherein the housing consists of magnesium alloy, and the side straps consist of a material of high temperature-resistant steel containing a preponderate content of manganese and nickel.

3. Drive chain according to claim 2, wherein the housing has a temperature-expansion coefficient of approximately $26 \times 10^{-6}$ m/m · °C, and the side strap material has a temperature-expansion coefficient of approximately $21 \times 10^{-6}$ m/m · °C.

4. Drive chain according to claim 1, wherein the housing has a temperature-expansion coefficient of approximately $26 \times 10^{-6}$ m/m · °C, and the side strap material has a temperature-expansion coefficient of approximately $21 \times 10^{-6}$ m/m · °C.

5. A drive chain and housing arrangement comprising a housing, a first wheel rotatably supported in said housing for rotation about a first axis, a second wheel supported for rotation about a second axis which is parallel to and spaced from said first axis, and a drive chain drivingly connecting said first and second wheels with a predetermined relative rotation of said first and second wheels, said drive chain including a plurality of individual relatively movable chain units interconnected with one another, wherein the temperature-expansion coefficient of the chain units is approximately equal to the temperature-expansion coefficient of the material of the housing, whereby thermal expansion of said housing is compensated for by corresponding thermal expansion of said chain units so as to maintain said predetermined relative rotation between said first and second wheels over varying temperature conditions.

6. An arrangement according to claim 5, wherein said first wheel is connected to a camshaft of an internal combustion engine, and said second wheel is connected to a crankshaft of said internal combustion engine.

7. An arrangement according to claim 6, wherein a chain tensioning device is positioned between said first and second wheels for guiding said drive chain.

8. An arrangement according to claim 5, wherein each of said chain units includes a pair of side straps interconnected with one another by bolts and rollers operatively mounted at the bolts, and wherein the temperature-expansion coefficient of said side straps is approximately equal to the temperature-expansion coefficient of the material of the housing.

9. An arrangement according to claim 8, wherein said rollers extend parallel to said first and second axes.

10. An arrangement according to claim 5, wherein the housing consists of magnesium alloy, and wherein the chain units include a material of high temperature-resistant steel containing a preponderate content of manganese and nickel.

11. An arrangement according to claim 5, wherein the housing has a temperature-expansion coefficient of approximately $26 \times 10^{-6}$ m/m · °C, and the chain units include a material having a temperature-expansion coefficient of approximately $21 \times 10^{-6}$ m/m · °C.

* * * * *